(12) United States Patent
Lee et al.

(10) Patent No.: US 11,718,694 B2
(45) Date of Patent: Aug. 8, 2023

(54) SUPER ABSORBENT POLYMER AND PREPARATION METHOD THEREOF

(71) Applicant: LG Chem, Ltd., Seoul (KR)

(72) Inventors: Hyemin Lee, Daejeon (KR); Tae Young Won, Daejeon (KR); Jungmin Sohn, Daejeon (KR); Junwye Lee, Daejeon (KR); Seongbeom Heo, Daejeon (KR); Kwangin Shin, Daejeon (KR); Chang Hun Han, Daejeon (KR)

(73) Assignee: LG Chem, Ltd.

( * ) Notice: Subject to any disclaimer, the term of this patent is extended or adjusted under 35 U.S.C. 154(b) by 209 days.

(21) Appl. No.: 17/271,414

(22) PCT Filed: Dec. 20, 2019

(86) PCT No.: PCT/KR2019/018228
§ 371 (c)(1),
(2) Date: Feb. 25, 2021

(87) PCT Pub. No.: WO2020/145548
PCT Pub. Date: Jul. 16, 2020

(65) Prior Publication Data
US 2021/0309777 A1    Oct. 7, 2021

(30) Foreign Application Priority Data
Jan. 7, 2019  (KR) .................. 10-2019-0001977

(51) Int. Cl.
*C08F 220/06* (2006.01)
*C08J 3/075* (2006.01)
(Continued)

(52) U.S. Cl.
CPC ............. *C08F 220/06* (2013.01); *C08J 3/075* (2013.01); *C08J 3/122* (2013.01); *C08J 3/245* (2013.01); *C08J 2333/02* (2013.01)

(58) Field of Classification Search
CPC .. C08F 220/06; C08F 2/00; C08F 2/01; C08F 2810/20; C08J 3/075; C08J 3/122;
(Continued)

(56) References Cited

U.S. PATENT DOCUMENTS

| 4,883,478 A | 11/1989 | Lerailler et al. |
| 5,597,873 A | 1/1997 | Chambers et al. |

(Continued)

FOREIGN PATENT DOCUMENTS

| CN | 104974312 A | 10/2015 |
| CN | 108884241 A | 11/2018 |

(Continued)

OTHER PUBLICATIONS

Translation of KR 2015-0132035 (Year: 2015).*
(Continued)

*Primary Examiner* — Robert C Boyle
(74) *Attorney, Agent, or Firm* — Lerner David LLP

(57) ABSTRACT

The present disclosure relates to a super absorbent polymer and a preparation method of the same, which not only has excellent basic absorption performance, but also exhibits an improved absorption rate, and the like. The super absorbent polymer includes a base resin powder containing a first cross-linked polymer of a water-soluble ethylene-based unsaturated monomer having at least partially neutralized acidic groups; and a surface cross-linked layer containing a second cross-linked polymer in which the first cross-linked polymer is additionally cross-linked by a surface cross-linking agent on the base resin powder, wherein the super absorbent polymer contains less than 9.9% by number of super absorbent polymer particles having an aspect ratio, which is defined as shortest diameter/longest diameter of each super absorbent polymer particle, of less than 0.5, a
(Continued)

vortex time is 5 to 55 seconds by a vortex method, and a surface tension is 50 to 80 mN/m.

8 Claims, 1 Drawing Sheet

(51) Int. Cl.
  *C08J 3/12* (2006.01)
  *C08J 3/24* (2006.01)
(58) Field of Classification Search
  CPC . C08J 3/245; C08J 2333/02; C08J 3/12; C08J 3/24; C08K 5/0025
  See application file for complete search history.

(56) References Cited

U.S. PATENT DOCUMENTS

| | | | |
|---|---|---|---|
| 6,677,408 | B1 | 1/2004 | Mahling et al. |
| 2007/0106013 | A1 | 5/2007 | Adachi et al. |
| 2008/0200623 | A1* | 8/2008 | Weismantel ............... C08F 2/01 422/131 |
| 2008/0221282 | A1 | 9/2008 | Weismantel et al. |
| 2008/0275195 | A1 | 11/2008 | Weismantel et al. |
| 2011/0059329 | A1 | 3/2011 | Dobrawa et al. |
| 2011/0313113 | A1* | 12/2011 | Sakamoto ............... C08F 20/10 526/318.41 |
| 2012/0258851 | A1 | 10/2012 | Nakatsuru et al. |
| 2013/0026412 | A1 | 1/2013 | Machida et al. |
| 2013/0101851 | A1 | 4/2013 | Takaai et al. |
| 2013/0158495 | A1 | 6/2013 | Handa et al. |
| 2014/0296465 | A1 | 10/2014 | Sakamoto et al. |
| 2015/0259494 | A1 | 9/2015 | Takaai et al. |
| 2015/0299404 | A1 | 10/2015 | Daniel et al. |
| 2016/0096944 | A1 | 4/2016 | Wattebled et al. |
| 2016/0332141 | A1 | 11/2016 | Machida et al. |
| 2017/0267793 | A1 | 9/2017 | Imura et al. |
| 2018/0186042 | A1 | 7/2018 | McIntosh et al. |
| 2018/0265645 | A1 | 9/2018 | Nam et al. |
| 2019/0119452 | A1 | 4/2019 | Yoon et al. |
| 2019/0135993 | A1 | 5/2019 | Daniel et al. |
| 2019/0176125 | A1 | 6/2019 | Yoon et al. |
| 2019/0217272 | A1 | 7/2019 | Hong et al. |
| 2019/0276609 | A1 | 9/2019 | Lee et al. |
| 2020/0009530 | A1 | 1/2020 | Ahn et al. |
| 2021/0230316 | A1 | 7/2021 | Won et al. |

FOREIGN PATENT DOCUMENTS

| | | |
|---|---|---|
| CN | 109071832 A | 12/2018 |
| CN | 112204091 A | 1/2021 |
| EP | 1029886 A2 | 8/2000 |
| EP | 1130045 A2 | 9/2001 |
| EP | 2342236 A1 | 7/2011 |
| EP | 2399944 A1 | 12/2011 |
| EP | 2518092 A1 | 10/2012 |
| EP | 3085439 A1 | 10/2016 |
| EP | 3112022 A1 | 1/2017 |
| EP | 3202823 A1 | 8/2017 |
| EP | 3312218 A1 | 4/2018 |
| EP | 3783053 A1 | 2/2021 |
| JP | H10500712 A | 1/1998 |
| JP | H11286611 A | 10/1999 |
| JP | 2000302876 A | 10/2000 |
| JP | 2009507117 A | 2/2009 |
| JP | 2009507118 A | 2/2009 |
| JP | 2009507119 A | 2/2009 |
| JP | 2013503927 A | 2/2013 |
| JP | 2018138673 A | 9/2018 |
| KR | 20020012268 A | 2/2002 |
| KR | 20060027360 A | 3/2006 |
| KR | 20110088501 A | 8/2011 |
| KR | 20120132475 A | 12/2012 |
| KR | 20130140660 A | 12/2013 |
| KR | 20150068321 A | 6/2015 |
| KR | 2015-0132035 | * 11/2015 |
| KR | 20150132035 A | 11/2015 |
| KR | 20160010516 A | 1/2016 |
| KR | 20170095268 A | 8/2017 |
| KR | 20180074385 A | 7/2018 |
| KR | 20180078167 A | 7/2018 |
| KR | 20180092841 A | 8/2018 |
| WO | 1987003208 A1 | 6/1987 |
| WO | 2010040465 A1 | 4/2010 |
| WO | 2010095427 A1 | 8/2010 |
| WO | 2011026876 A1 | 3/2011 |
| WO | 2011078298 A1 | 6/2011 |
| WO | 2014079694 A1 | 5/2014 |
| WO | 2015129917 A1 | 9/2015 |
| WO | 2016052537 A1 | 4/2016 |
| WO | 2016182082 A1 | 11/2016 |
| WO | 2018147559 A1 | 8/2018 |
| WO | 2020116760 A1 | 6/2020 |

OTHER PUBLICATIONS

Extended European Search Report including Written Opinion for Application No. 19908136.5 dated Sep. 21, 2021, pp. 1-10.
Third Party Observation for Application No. EP19908136.5 dated Nov. 17, 2022, pp. 1-6.
Third Party Observation for PCT/KR2019/018228 dated Apr. 28, 2021.
International Search Report for PCT/KR2019/018228 dated Apr. 21, 2020; 5 pages.
Odian, George, "Principles of Polymerization", John Wiley & Sons, 1981, p. 203.
Schwalm, Reinhold, "UV Coatings: Basics, Recent Developments and New Applications", Elsevier, Dec. 2006, p. 115.

* cited by examiner

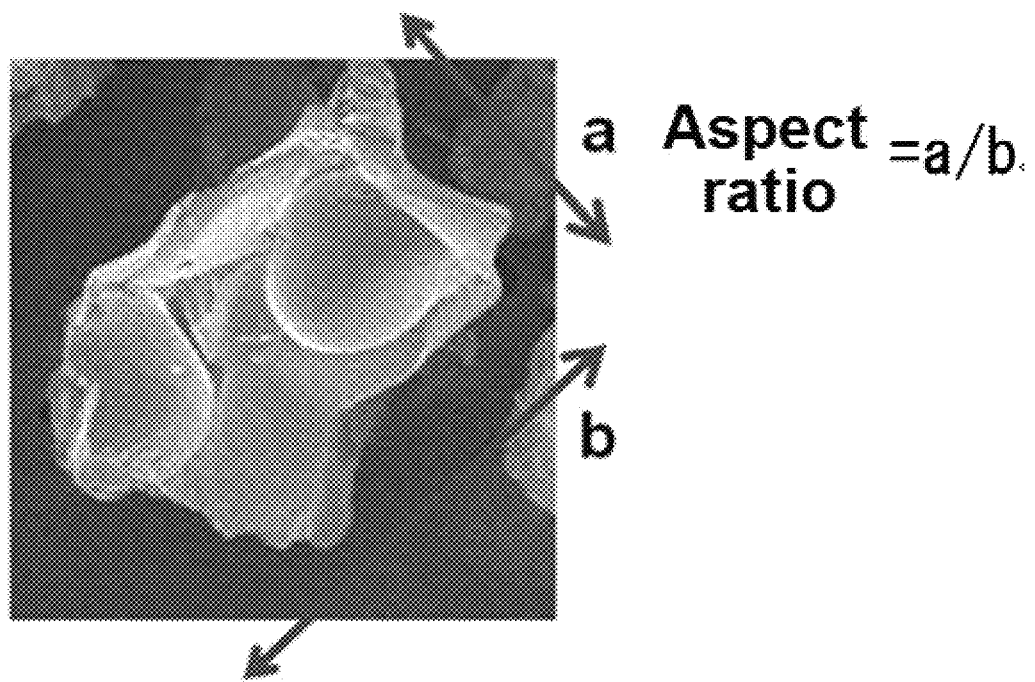

ial application of the additive is often uneven. As a result, in the prior art in which a porous structure or the like was formed to achieve a high absorption rate of the super absorbent polymer, other physical properties such as absorption performance were often deteriorated. In addition, according to the conventional method, polymer particles may be easily broken during pulverization, classification, or transfer thereof. When this occurs, a lot of fine powder is generated, and physical properties after surface cross-linking may be deteriorated. In addition, due to breakage of particles in the pulverization, classification, or transfer process, the surface area of the super absorbent polymer may be reduced, and as a result, the absorption rate may be rather reduced.

SUPER ABSORBENT POLYMER AND PREPARATION METHOD THEREOF

CROSS-REFERENCE TO RELATED APPLICATIONS

The present application is a national phase entry under 35 U.S.C. § 371 of International Application No. PCT/KR2019/018228, filed on Dec. 20, 2019, which claims priority to Korean Patent Application No. 10-2019-0001977 filed on Jan. 7, 2019, the disclosures of which are incorporated herein by reference in their entirety.

TECHNICAL FIELD

The present disclosure relates to a super absorbent polymer and a preparation method of the same, which not only has excellent basic absorption performance, but also exhibits an improved absorption rate, and the like.

BACKGROUND

A super absorbent polymer (SAP) is a type of synthetic polymeric material capable of absorbing 500 to 1000 times its own weight of moisture. Various manufacturers have denominated it with different names, such as SAM (Super Absorbency Material), AGM (Absorbent Gel Material), and the like. Such super absorbent polymers started to be practically applied in sanitary products, and they are now being widely used not only for hygiene products such as disposable diapers for children, etc., but also for water retaining soil products for gardening, water stop materials for the civil engineering and construction, sheets for raising seedling, fresh-keeping agents for food distribution fields, materials for poultices, or the like.

In most cases, these super absorbent polymers have been widely used in the field of hygienic materials such as diapers or sanitary napkins. For these applications, the super absorbent polymer should exhibit high moisture absorbency, it should not release the absorbed water even in the external pressure, and additionally it should well retain the shape even in a state where the volume is expanded (swelled) by absorbing water, thereby exhibiting excellent liquid permeability.

In recent years, as the demand for a thin diaper increases, the content of fibrous materials such as pulp in the diaper decreases, and the proportion of the super absorbent polymer in the diaper tends to increase. Therefore, the super absorbent polymer needs to have the performance of the fibrous material of the diaper. For this, the super absorbent polymer should have high absorbency as well as a high absorption rate. Particularly, as the diaper becomes thinner, the baby's movement increases the risk of urine leaking from the diaper, and thus the demand for a high absorption rate of the super absorbent polymer is increasing.

Meanwhile, in order for the super absorbent polymer to exhibit a higher absorption rate, it is necessary to have a porous structure with a large surface area and a plurality of fine pores formed therein. Accordingly, a super absorbent polymer having such a porous structure has been manufactured by applying a blowing agent or a surfactant.

In such a super absorbent polymer, a large amount of particles having a small aspect ratio are produced after pulverization, and these particles are highly likely to have a non-uniform shape. For this reason, when cross-linking the surface after pulverization or mixing an additive for improving physical properties, the surface cross-linking or the application of the additive is often uneven. As a result, in the prior art in which a porous structure or the like was formed to achieve a high absorption rate of the super absorbent polymer, other physical properties such as absorption performance were often deteriorated. In addition, according to the conventional method, polymer particles may be easily broken during pulverization, classification, or transfer thereof. When this occurs, a lot of fine powder is generated, and physical properties after surface cross-linking may be deteriorated. In addition, due to breakage of particles in the pulverization, classification, or transfer process, the surface area of the super absorbent polymer may be reduced, and as a result, the absorption rate may be rather reduced.

Accordingly, there is a continuous demand for the development of a technology capable of preparing a super absorbent polymer exhibiting an improved absorption rate while suppressing a decrease in absorption performance by reducing an amount of a blowing agent used and the generation of particles having a small aspect ratio.

DETAILED DESCRIPTION OF THE INVENTION

Technical Problem

Accordingly, the present disclosure provides a super absorbent polymer exhibiting not only excellent basic absorption performance but also an improved absorption rate and liquid permeability, and a preparation method of the same.

Technical Solution

In the present disclosure, there is provided a super absorbent polymer including a base resin powder containing a first cross-linked polymer of a water-soluble ethylene-based unsaturated monomer having at least partially neutralized acidic groups; and a surface cross-linked layer containing a second cross-linked polymer in which the first cross-linked polymer is additionally cross-linked by a surface cross-linking agent on the base resin powder, wherein the super absorbent polymer contains less than 9.9% by number of super absorbent polymer particles having an aspect ratio, which is defined as shortest diameter/longest diameter of each super absorbent polymer particle, of less than 0.5, a vortex time is 5 to 55 seconds by a vortex method, and a surface tension is 50 to 80 mN/m.

In the present disclosure, there is also provided a preparation method of a super absorbent polymer, including the steps of:

preparing a monomer mixture including a water-soluble ethylene-based unsaturated monomer having at least partially neutralized acidic groups and an internal cross-linking agent;

transferring the monomer mixture to a polymerization reactor along a transfer pipe having a diameter that varies from section to section;

cross-linking and polymerizing the monomer mixture transferred to the polymerization reactor to form a hydrogel polymer containing a first cross-linked polymer;

gel-pulverizing, drying, pulverizing and classifying the hydrogel polymer to form a base resin powder containing less than 9.9% by number of base resin powder having an aspect ratio, which is defined as shortest diameter/longest diameter of each base resin powder, of less than 0.5; and further cross-linking a surface of the base resin powder in the presence of a surface cross-linking agent to form a surface cross-linked layer;

wherein in the transfer step of the monomer mixture, the monomer mixture has a maximum transfer rate in the minimum diameter section of the transfer pipe and a minimum transfer rate in the maximum diameter section of the transfer pipe, and the maximum transfer rate is 2.5 times or more compared to the minimum transfer rate.

Hereinafter, a super absorbent polymer and a preparation method thereof according to specific embodiments of the present invention will be described in detail. However, this is merely presented as an example of the present invention, and will be apparent to those skilled in the art that the scope of the present invention is not limited to these embodiments, and various modifications can be made to the embodiments within the scope of the present invention.

In addition, unless stated otherwise throughout this specification, the term "comprise" "include" or "contain" refers to including any constituent element (or constituent component) without particular limitation, and it cannot be interpreted as a meaning of excluding an addition of other constituent element (or constituent component).

According to one embodiment of the present disclosure, there is provided a super absorbent polymer including a base resin powder containing a first cross-linked polymer of a water-soluble ethylene-based unsaturated monomer having at least partially neutralized acidic groups; and a surface cross-linked layer containing a second cross-linked polymer in which the first cross-linked polymer is additionally cross-linked by a surface cross-linking agent on the base resin powder, wherein the super absorbent polymer contains less than 9.9% by number of super absorbent polymer particles having an aspect ratio, which is defined as shortest diameter/longest diameter of each super absorbent polymer particle, of less than 0.5, a vortex time is 5 to 55 seconds by a vortex method, and a surface tension is 50 to 80 mN/m.

The super absorbent polymer of one embodiment of the present disclosure can be prepared according to the method described below by changing a transfer rate of a monomer mixture to a specific range in the process of transferring the monomer mixture to a polymerization reactor, followed by polymerization, drying, pulverization, classification, and surface cross-linking.

As a result of the research of the present inventors, it has been found that when the transfer rate of the monomer mixture is changed, physical foaming occurs, and thus a super absorbent polymer exhibiting a developed porous structure and an excellent absorption rate could be prepared while reducing an amount of a blowing agent used or using no blowing agent. Therefore, the present invention has been completed on the basis of such findings.

This may be because gas solubility such as oxygen in the monomer mixture decreases, as the pressure applied to the monomer mixture changes instantaneously while the transfer rate of the monomer mixture changes during transfer through the transfer pipe. Therefore, a lot of bubbles are generated from the monomer mixture in the step of adjusting the transfer rate, and a foaming polymerization may proceed in the cross-linking polymerization step by the generated bubbles. As a result, a super absorbent polymer having a developed porous structure may be prepared by physical foaming even if a blowing agent is not used or its amount is reduced.

As a result of the greatly reduced use of the blowing agent, the formation ratio of super absorbent polymer particles having a small aspect ratio, which is an aspect ratio defined as shortest diameter/longest diameter of less than 0.5, can be greatly reduced to less than 9.9% by number, 1 to 9.9% by number, or 3 to 9.7% by number. Therefore, there is practically no fear that other physical properties such as absorption performance are deteriorated during surface cross-linking or mixing with additives and the like. In addition, as the formation ratio of particles having a small aspect ratio is reduced, the degradation of final physical properties of the super absorbent polymer, which is caused by damage or breakage of particles during pulverization, classification, or transfer thereof, may also be greatly reduced.

Thus, the super absorbent polymer of one embodiment can exhibit a significantly improved absorption rate as it has a porous structure developed by the above-described physical foaming while maintaining excellent physical properties such as absorption performance.

Therefore, the super absorbent polymer of one embodiment can maintain basic absorption performance while having a more improved absorption rate and the like, unlike the conventional common sense that it is difficult to improve the absorption rate and absorption performance together. Thus, it can be preferably applied to sanitary materials such as diapers having a thinner thickness.

Hereinafter, the super absorbent polymer of one embodiment will be described in more detail.

In addition, the term "super absorbent polymer" in this disclosure refers to a super absorbent polymer including a base resin powder containing a first cross-linked polymer of a water-soluble ethylene-based unsaturated monomer having at least partially neutralized acidic groups; and a surface cross-linked layer containing a second cross-linked polymer in which the first cross-linked polymer is additionally cross-linked by a surface cross-linking agent on the base resin powder.

The water-soluble ethylene-based unsaturated monomer may be any monomer commonly used in the preparation of a super absorbent polymer. As a non-limiting example, the water-soluble ethylene-based unsaturated monomer may be a compound represented by the following Chemical Formula 1:

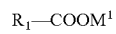 [Chemical Formula 1]

in Chemical Formula 1, $R_1$ is a C2 to C5 alkyl group having an unsaturated bond, and $M^1$ is a hydrogen atom, a monovalent or divalent metal, an ammonium group, or an organic amine salt.

Preferably, the monomer may be at least one selected from the group consisting of acrylic acid, methacrylic acid, and a monovalent metal salt, a divalent metal salt, an ammonium salt and an organic amine salt of the acid. When acrylic acid and/or a salt thereof is used as the water-soluble ethylene-based unsaturated monomer, it is advantageous to obtain a super absorbent polymer with improved absorbency. In addition, at least one selected from the group consisting of an anionic monomer of maleic anhydride, fumalic acid, crotonic acid, itaconic acid, 2-acryloylethane sulfonic acid, 2-methacryloylethane sulfonic acid, 2-(meth) acryloylpropane sulfonic acid, or 2-(meth)acrylamide-2-methyl propane sulfonic acid, or a salt thereof; a nonionic hydrophilic monomer of (meth)acrylamide, N-substituted (meth)acrylate, 2-hydroxyethyl(meth)acrylate, 2-hydroxypropyl(meth)acrylate, methoxypolyethyleneglycol(meth)

acrylate, or polyethyleneglycol(meth)acrylate; and an amino-containing unsaturated monomer of (N,N)-dimethylaminoethyl(meth)acrylate or (N,N)-dimethylaminopropyl (meth)acrylamid, or a quaternary compound thereof may be used as the monomer.

Herein, the water-soluble ethylene-based unsaturated monomer may be those having acidic groups which are at least partially neutralized. Preferably, the monomers may be those partially neutralized with an alkali substance such as sodium hydroxide, potassium hydroxide, ammonium hydroxide, or the like.

In this regard, a degree of neutralization of the monomer may be 40 to 95 mol %, 40 to 85 mol %, or 45 to 80 mol %. The degree of neutralization may vary depending on the final properties, but an excessively high degree of neutralization precipitates the neutralized monomers, and thus polymerization may not readily occur. On the contrary, an excessively low degree of neutralization not only deteriorates the absorbency of the polymer, but also endows the polymer with hard-to-handle properties, such as those of an elastic rubber.

The 'first cross-linked polymer' means that the above-mentioned water-soluble ethylene-based unsaturated monomer is cross-linked and polymerized in the presence of an internal cross-linking agent, and the 'base resin powder' refers to a material containing the first cross-linked polymer. In addition, the 'second cross-linked polymer' refers to a material in which the first cross-linked polymer is additionally cross-linked by a surface cross-linking agent, and thus is formed on the base resin powder. The surface cross-linking agent will be described later.

In the super absorbent polymer of one embodiment, as the base resin powder is obtained by physical foaming polymerization, or the like even when a blowing agent is not used or its amount is reduced, the base resin powder and the super absorbent polymer particles can have a minimized production ratio of particles having a relatively small aspect ratio. More specifically, the super absorbent polymer of one embodiment contains a plurality of super absorbent polymer particles, and for example, may contain super absorbent polymer particles having an aspect ratio defined as shortest diameter/longest diameter of less than 0.5 in a ratio of less than 9.9% by number, 1 to 9.9% by number, or 3 to 9.7% by number, based on the total number of super absorbent polymer particles.

At this time, the aspect ratio of the base resin powder and the super absorbent polymer particles can be obtained, for example, as shown in FIG. 1, by analyzing each particle with an electron microscope to measure the shortest diameter (a) and the longest diameter (b), and calculating the aspect ratio of each base resin powder and super absorbent polymer particle. From the aspect ratio data of each particle calculated in this way, the ratio by the number of particles whose aspect ratio is less than 0.5 can be calculated. For reference, it is confirmed that the aspect ratio of the base resin powder and the aspect ratio of the super absorbent polymer particles are equivalent to each other.

As the super absorbent polymer of one embodiment has a developed porous structure by physical foaming polymerization and contains the particles having a small aspect ratio in a significantly reduced content, the surface cross-linked layer and/or additives may be uniformly formed on the entire particle. Accordingly, the super absorbent polymer of one embodiment may exhibit an improved absorption rate due to the developed porous structure while maintaining excellent absorption performance and/or liquid permeability.

In addition, as the particles having a small aspect ratio are included in a reduced content, it is possible to significantly reduce the phenomenon that the super absorbent polymer particles are crushed or physical properties thereof are deteriorated due to physical damage in the process of transferring the super absorbent polymer or applying the polymer to products. Conversely, when a large amount of particles having a small aspect ratio is included, the shape of the super absorbent polymer particles becomes non-uniform, and a number of particles with a relatively long shape are included, so that the super absorbent polymer particles may be physically damaged or physical properties thereof may be deteriorated in the process of transferring the super absorbent polymer or applying the polymer to products.

Meanwhile, the super absorbent polymer of one embodiment has excellent absorption performance under pressure or under no-pressure and absorption rate, which may be defined by physical properties such as CRC, AUP, absorbency, vortex absorption rate, or surface tension.

Specifically, the super absorbent polymer of one embodiment may have centrifuge retention capacity (CRC) to saline (0.9 wt % aqueous solution of sodium chloride) for 30 min of 25 to 35 g/g, or 26 to 33 g/g. This centrifuge retention capacity (CRC) range may define excellent absorption performance under no-pressure exhibited by the super absorbent polymer of one embodiment.

The centrifuge retention capacity (CRC) to saline can be calculated by the following Formula 1 after making the super absorbent polymer absorb the saline over 30 minutes:

$$CRC(g/g) = \{[W_2(g) - W_1(g) - W_0(g)]/W_0(g)\} \quad \text{[Formula 1]}$$

In Formula 1, $W_0(g)$ is an initial weight (g) of the super absorbent polymer, $W_1(g)$ is a weight measured after immersing a non-woven fabric bag containing no super absorbent polymer into physiological saline for 30 min at room temperature and dehydrating the same by using a centrifuge at 250 G for 3 min, and $W_2(g)$ is a weight measured after immersing a non-woven fabric bag containing the super absorbent polymer into physiological saline for 30 min at room temperature and dehydrating the same by using a centrifuge at 250 G for 3 min.

In addition, the super absorbent polymer of one embodiment may have absorbency under pressure (AUP) to saline (0.9 wt % aqueous solution of sodium chloride) at 0.7 psi for 1 hour of 22 to 28 g/g, or 23 to 27 g/g. This absorbency under pressure (AUP) range may define excellent absorption performance under pressure exhibited by the super absorbent polymer of one embodiment.

The absorbency under pressure (AUP) to saline can be calculated by the following Formula 2 after making the super absorbent polymer absorb the saline under a pressure of 0.7 psi over 1 hour:

$$AUP(g/g) = [W_4(g) - W_3(g)]/W_0(g) \quad \text{[Formula 2]}$$

In Formula 2, $W_0$ (g) is an initial weight (g) of the super absorbent polymer, $W_3$ (g) is a sum of a weight of the super absorbent polymer and a weight of the device providing a load to the polymer, and $W_4$ (g) is a sum of a weight of the super absorbent polymer and a weight of the device providing a load to the polymer, after making the super absorbent polymer absorb the saline for one hour under a load (0.7 psi).

In addition, the super absorbent polymer of one embodiment has the centrifuge retention capacity (CRC) and the absorbency under pressure (AUP) in the above-described range, thereby having an absorbency represented by the following Equation 1 of 46 to 63 g/g or 50 to 60 g/g:

$$\text{Absorbency} = \text{CRC} + \text{AUP} \qquad [\text{Equation 1}]$$

in Equation 1,

CRC is centrifuge retention capacity to saline (0.9 wt % aqueous solution of sodium chloride) for 30 min calculated by the above Formula 1, and AUP is absorbency under pressure to saline (0.9 wt % aqueous solution of sodium chloride) at 0.7 psi for 1 hour calculated by the above Formula 2.

Accordingly, the super absorbent polymer of one embodiment exhibits excellent absorption performance such as basic absorbency and absorbency under pressure, and may be suitably used for various sanitary materials.

In addition, the super absorbent polymer of one embodiment may have a surface tension of 50 to 80 mN/m, or 65 to 75 mN/m.

Such surface tension can be measured, for example, using a surface tension meter at a room temperature of 23±2° C. The specific method of measuring the surface tension is described in Examples described later.

The surface tension of the super absorbent polymer is a property distinguished from water retention capacity and absorbency under pressure, and may be a measure for evaluating a leakage of urine in diapers containing the super absorbent polymer. The surface tension refers to a surface tension measured for the brine after swelling the super absorbent polymer in brine. When the surface tension of the super absorbent polymer is low, it is highly likely that urine leaks from diapers manufactured using the same. According to the super absorbent polymer of one embodiment, it is possible to produce a high-quality hygiene product by reducing the possibility of a leakage by having an appropriate range of surface tension along with an excellent absorption rate.

Meanwhile, the super absorbent polymer of one embodiment may have a vortex time of 5 to 55 seconds, or 20 to 50 seconds by a vortex method, which may define an excellent absorption rate of the super absorbent polymer.

The vortex time (or absorption rate) can be calculated by adding 2 g of the super absorbent polymer to 50 mL of saline at 23° C. to 24° C., stirring a magnetic bar (8 mm in diameter and 31.8 mm in length) at 600 rpm, and measuring the time until vortex disappeared in seconds.

The super absorbent polymer may exhibit an excellent absorption rate defined by the above-mentioned vortex time, while maintaining excellent absorption performance and having a developed porous structure. Therefore, the super absorbent polymer can be preferably used in hygiene materials having a reduced fiber content such as pulp.

Meanwhile, in the super absorbent polymer of one embodiment described above, the first cross-linked polymer contained in the base resin powder may be a polymer in which the monomer is cross-linked and polymerized in the presence of at least one internal cross-linking agent selected from the group consisting of trimethylolpropane tri(meth)acrylate, ethyleneglycol di(meth)acrylate, polyethyleneglycol di(meth)acrylate, propyleneglycol di(meth)acrylate, polypropyleneglycol di(meth)acrylate, butanediol di(meth)acrylate, butyleneglycol di(meth)acrylate, diethyleneglycol di(meth)acrylate, hexanediol di(meth)acrylate, triethyleneglycol di(meth)acrylate, tripropyleneglycol di(meth)acrylate, tetraethyleneglycol di(meth)acrylate, dipentaerythritol pentaacrylate, glycerin tri(meth)acrylate, pentaerythritol tetraacrylate, ethyleneglycol diglycidyl ether, polyethyleneglycol diglycidyl ether, glycerol polyglycidyl ether, propyleneglycol diglycidyl ether, and polypropyleneglycol diglycidyl ether. In addition, various internal cross-linking agents known to be usable in the process of preparing a super absorbent polymer can be also used.

In the above-described super absorbent polymer, the second cross-linked polymer includes a surface cross-linked layer in which the first cross-linked polymer is additionally cross-linked by a surface cross-linking agent. As the surface cross-linking agent, any functional compound known to be usable in the process of preparing a super absorbent polymer can be used. Specifically, at least one selected from the group consisting of polyalcohol-based compounds, polyepoxy-based compounds, polyamine compounds, haloepoxy compounds, condensates of haloepoxy compounds, oxazoline-based compounds, and alkylene carbonate-based compounds may be used. Alkylene carbonate-based compounds having 2 to 10 carbon atoms or 2 to 6 carbon atoms, more specifically ethylene carbonate, propylene carbonate, trimethylene carbonate or glycerol carbonate may be more preferably used in consideration of liquid permeability and/or gel strength of the super absorbent polymer.

The super absorbent polymer of one embodiment may have a particle diameter of 150 to 850 μm. More specifically, at least 95 wt % of the base resin powder and the super absorbent polymer including the same has a particle diameter of 150 to 850 μm, and a fine powder having a particle diameter of less than 150 μm is included in less than 5 wt %, less than 3 wt %, or less than 1 wt %. At this time, the particle diameter of the super absorbent polymer may be defined as the longest diameter of the super absorbent polymer particles.

According to another embodiment of the present disclosure, there is also provided a preparation method of a super absorbent polymer, including the steps of:

preparing a monomer mixture including a water-soluble ethylene-based unsaturated monomer having at least partially neutralized acidic groups and an internal cross-linking agent;

transferring the monomer mixture to a polymerization reactor along a transfer pipe having a diameter that varies from section to section;

cross-linking and polymerizing the monomer mixture transferred to the polymerization reactor to form a hydrogel polymer containing a first cross-linked polymer;

gel-pulverizing, drying, pulverizing and classifying the hydrogel polymer to form a base resin powder containing less than 9.9% by number of base resin powder having an aspect ratio, which is defined as shortest diameter/longest diameter of each base resin powder, of less than 0.5; and further cross-linking a surface of the base resin powder in the presence of a surface cross-linking agent to form a surface cross-linked layer;

wherein in the transfer step of the monomer mixture, the monomer mixture has a maximum transfer rate in the minimum diameter section of the transfer pipe and a minimum transfer rate in the maximum diameter section of the transfer pipe, and the maximum transfer rate is 2.5 times or more compared to the minimum transfer rate.

In the preparation method of another embodiment, the maximum transfer rate in the minimum diameter section of the transfer pipe is controlled to be 2.5 times or more, or 3 times or more and 5 times or less, or 4 times or less compared to the minimum transfer rate in the maximum diameter section by changing a diameter of the transfer pipe or a transfer rate thereof in the process of transferring the monomer mixture to a polymerization reactor. When the transfer rate of the monomer mixture is changed, the pressure applied to the monomer mixture during transfer changes continuously/instantaneously, and gas solubility such as oxygen in the monomer mixture may be decreased, and as a result, a large amount of bubbles may be generated from the monomer mixture. Therefore, a foaming polymerization may proceed in the cross-linking polymerization step by the generated bubbles. As a result, according to the preparation method of another embodiment, a super absorbent polymer having a developed porous structure and an improved absorption rate may be prepared by physical foaming even if a blowing agent is not used or its amount is reduced.

As a result of the greatly reduced use of the blowing agent, the drying, pulverization, and classification after the cross-linking polymerization can greatly reduce the formation ratio of the base resin powder and the super absorbent polymer particles having a small aspect ratio, which is an aspect ratio defined as shortest diameter/longest diameter of less than 0.5, to less than 9.9% by number, 1 to 9.9% by number, or 3 to 9.7% by number. Therefore, there is practically no fear that other physical properties such as absorption performance are deteriorated during surface cross-linking or mixing with additives and the like.

As a result, according to the preparation method of another embodiment, it is possible to prepare the super absorbent polymer of one embodiment exhibiting an improved absorption rate and maintaining excellent absorption performance.

Hereinafter, the preparation method will be described in more detail in each step.

First, the preparation method of another embodiment includes a step of forming a hydrogel polymer by cross-linking polymerization. Specifically, it is a step of thermally polymerizing or photopolymerizing a monomer mixture containing a water-soluble ethylene-based unsaturated monomer and a polymerization initiator in the presence of an internal cross-linking agent to form a hydrogel polymer.

The water-soluble ethylene-based unsaturated monomer contained in the monomer mixture is as described above.

In addition, the monomer mixture may include a polymerization initiator generally used in the preparation of a super absorbent polymer. For example, the polymerization initiator may be an initiator for thermal polymerization or an initiator for photopolymerization according to the polymerization method. However, even when the photopolymerization method is applied thereto, a certain amount heat is generated by UV radiation and the like, and some heat occurs as the polymerization reaction, an exothermal reaction, progresses. Therefore, the monomer mixture may additionally include the thermal polymerization initiator.

For example, the photopolymerization initiator may be one or more compounds selected from the group consisting of benzoin ether, dialkyl acetophenone, hydroxyl alkylketone, phenyl glyoxylate, benzyl dimethyl ketal, acyl phosphine, and α-aminoketone. Further, as the specific example of acyl phosphine, commercial lucirin TPO, namely, 2,4,6-trimethyl-benzoyl-trimethyl phosphine oxide, may be used. More various photopolymerization initiators are well disclosed in "UV Coatings: Basics, Recent Developments and New Application (Elsevier, 2007)" written by Reinhold Schwalm, p 115, which can be referred to.

Furthermore, as the thermal polymerization initiator, one or more initiators selected from the group consisting of a persulfate-based initiator, an azo-based initiator, hydrogen peroxide, and ascorbic acid may be used. Specifically, sodium persulfate ($Na_2S_2O_8$), potassium persulfate ($K_2S_2O_8$), ammonium persulfate (($NH_4$)$_2S_2O_8$), and the like may be used as examples of the persulfate-based initiators; and 2,2-azobis-(2-amidinopropane)dihydrochloride, 2,2-azobis-(N,N-dimethylene)isobutyramidinedihydrochloride, 2-(carbamoylazo)isobutylonitril, 2,2-azobis-[2-(2-imidazolin-2-yl)propane]dihydrochloride, 4,4-azobis-(4-cyanovaleric acid), and the like may be used as examples of azo-based initiators. More various thermal polymerization initiators are well disclosed in "Principle of Polymerization (Wiley, 1981)" written by Odian, p 203, which can be referred to.

The concentration of the polymerization initiator in the monomer mixture may be 0.001 to 1 wt %. When the concentration of the polymerization initiator is excessively low, the polymerization rate becomes slow, and a large amount of residual monomers may be extracted from the final product. Conversely, when the concentration of the polymerization initiator is higher than the above range, polymer chains forming a network are shortened, so that the content of extractable components increases and absorbency under pressure decreases, thereby lowering physical properties of the polymer.

Meanwhile, the monomer mixture includes a cross-linking agent ("internal cross-linking agent") for improving physical properties of the polymer obtained by polymerization of the water-soluble ethylene-based unsaturated monomer. The cross-linking agent is for internally cross-linking the hydrogel polymer, and can be used separately from the "surface cross-linking agent" described later. Since the kind of the internal cross-linking agent has already been described above, additional description thereof will be omitted.

The total content of the internal cross-linking agent may be 0.01 to 2 parts by weight, or 0.05 to 1.8 parts by weight based on 100 parts by weight of a monomer mixture containing the internal cross-linking agent and the monomer. Within the content range of the internal cross-linking agent, a super absorbent polymer satisfying the physical properties of one embodiment can be obtained more effectively by achieving a cross-linking density inside the super absorbent polymer at an appropriate level. However, when the content of the internal cross-linking agent is too large, basic absorption performance of the super absorbent polymer may be deteriorated.

Meanwhile, the above-described monomer mixture may further include a blowing agent when an improvement in absorption rate or the like is required. However, as already described above, the method of another embodiment can prepare a super absorbent polymer having a highly developed porous structure and absorption rate, even if the blowing agent is used in a significantly reduced content than before.

The blowing agent may cause chemical foaming during polymerization to form more pores in the hydrogel polymer. For example, a carbonate-based blowing agent may be used, and specific examples thereof include sodium bicarbonate, sodium carbonate, potassium bicarbonate, potassium carbonate, calcium bicarbonate, calcium bicarbonate, magnesiumbicarbonate and magnesium carbonate.

In addition, the blowing agent may be added in a concentration of 0 to 1.0 parts by weight, 0 to 0.5 parts by weight, or 0.01 to 0.1 parts by weight based on 100 parts by weight of the acrylic acid-based monomer. When the amount of the blowing agent is increased, absorption performance of the super absorbent polymer may be deteriorated.

In addition, the monomer mixture may further include a surfactant to optimize the pore formation. The surfactant may function to uniformly distribute bubbles over the entire area of the polymer while maintaining the shape of bubbles formed in the monomer mixture. Therefore, the absorption rate of the super absorbent polymer can be further improved by the additional use of the surfactant.

As the surfactant, any component that has been used in the foaming polymerization of a super absorbent polymer can be used, and for example, a cationic, anionic or nonionic surfactant may be used.

The surfactant may be added in a concentration of 0.001 to 0.1 parts by weight, or 0.002 to 0.03 parts by weight based on 100 parts by weight of the acrylic acid-based monomer. When the concentration of the surfactant is too low, the role of stabilizing bubbles is insignificant and it is difficult to achieve an effect of improving the absorption rate. Conversely, when the concentration is too high, the surface tension of the super absorbent resin may be lowered, resulting in a leakage of water from diapers.

The monomer mixture may further include an additive such as a thickener, a plasticizer, a preservation stabilizer, an antioxidant, and the like, if necessary.

The raw materials such as the monomer, the polymerization initiator, and the internal cross-linking agent may be prepared in the form of a solution dissolved in a solvent.

At this time, any solvent which can dissolve the components may be used without limitation. For example, water, ethanol, ethyleneglycol, diethyleneglycol, triethyleneglycol, 1,4-butanediol, propyleneglycol, ethyleneglycol monobutylether, propyleneglycol monomethylether, propyleneglycol monomethylether acetate, methylethylketone, acetone, methylamylketone, cyclohexanone, cyclopentanone, diethyleneglycol monomethylether, diethyleneglycol ethylether, toluene, xylene, butyrolactone, carbitol, methylcellosolve acetate, N,N-dimethylacetamide or a mixture thereof may be used.

The solvent may be included in the monomer mixture at a residual quantity excluding the above components.

After forming the monomer mixture by mixing the above-described components, the monomer mixture may be transferred to a polymerization reactor through a transfer pipe while changing a transfer rate thereof. More specifically, the diameter of the transfer pipe and the transfer rate of the monomer mixture are changed in the transfer step of the monomer mixture, so that the maximum transfer rate in the minimum diameter section of the transfer pipe can be 2.5 times or more, or 3 times or more and 10 times or less, or 8 times or less compared to the minimum transfer rate in the maximum diameter section.

As described above, gas solubility such as oxygen in the monomer mixture may be decreased, as the pressure applied to the monomer mixture is controlled by changing the diameter of the transfer pipe or the transfer rate during transfer of the monomer mixture. Therefore, a lot of bubbles are generated from the monomer mixture, and a foaming polymerization may proceed in the cross-linking polymerization step by the generated bubbles. As a result, a super absorbent polymer having a developed porous structure may be prepared by the physical foaming.

When the maximum transfer rate is controlled to be less than 2.5 times the minimum transfer rate, the physical foaming and foaming polymerization may not proceed properly, and thus the porous structure and absorption rate of the super absorbent polymer may not be properly achieved. Conversely, when the maximum transfer rate is controlled too much, the additional foaming effect is insignificant and the transfer rate may not be properly controlled, which may cause difficulties in the process.

Meanwhile, it is possible to satisfy the relationship between the maximum and minimum transfer rates described above by adjusting the diameter of the transfer pipe or the flow rate of the monomer mixture to change the transfer rate. For example, the monomer mixture is transferred along a transfer pipe having a diameter that varies from section to section, and specifically, the diameter of the transfer pipe may be reduced along the transfer path. As a result, the monomer mixture may be controlled to have a maximum transfer rate in the minimum diameter section of the transfer pipe.

In a more specific example, the transfer pipe may have a diameter of 0.002 to 0.01 m, or 0.005 to 0.009 m in the minimum diameter section, and have a diameter of 0.011 to 0.020 m, or 0.012 to 0.016 m in the maximum diameter section before the minimum diameter section. The diameter of the transfer pipe may be appropriately determined within the above-mentioned range in consideration of the flow rate of the monomer mixture for achieving proper productivity of the super absorbent polymer, the relationship between transfer rates described above, and the like.

In the preparation of a super absorbent polymer, the monomer mixture may be transferred through the transfer pipe at a flow rate of 100 to 15000 kg/hr, 100 to 13000 kg/hr, or 110 to 1000 kg/hr in order to achieve proper productivity and control the relationship between transfer rates. When transferring the monomer mixture at such a flow rate, the relationship between transfer rates according to another embodiment can be adjusted by changing the diameter of the transfer pipe within the above-described range. As a result, it is possible to manufacture a super absorbent polymer exhibiting a developed porous structure and an excellent absorption rate by optimizing the degree of physical foaming.

Meanwhile, the monomer mixture may be transferred in the minimum diameter section of the transfer pipe at a maximum transfer rate of 0.45 to 2.5 m/s, or 0.7 to 2.2 m/s, and transferred in the maximum diameter section of the transfer pipe at a minimum transfer rate of 0.1 to 0.5 m/s, or 0.2 to 0.4 m/s by controlling the flow rate and the diameter of the transfer pipe.

After transferring to the polymerization reactor while physically foaming the monomer mixture by the above-described method, the monomer mixture may be thermally polymerized or photopolymerized to form a hydrogel polymer. The methods/conditions of the polymerization step are not particularly limited, and may be in accordance with the general polymerization conditions and methods of a super absorbent polymer.

Specifically, the polymerization method is largely divided into thermal polymerization and photopolymerization according to an energy source of the polymerization. In the case of thermal polymerization, it is generally carried out in a reactor having an agitation spindle, such as a kneader. In the case of photopolymerization, it may be carried out in a reactor equipped with a movable conveyor belt.

For example, a hydrogel polymer can be obtained by introducing the monomer mixture into a reactor equipped with an agitation spindle such as a kneader, and supplying hot air or heating the reactor to perform thermal polymerization. At this time, the hydrogel polymer may be discharged to a reactor outlet in the form of several millimeters to several centimeters particles depending on a shape of the agitation spindle provided in the reactor. Specifically, the hydrogel polymer may be obtained in various forms depending on the concentration and injection rate of the monomer mixture to be injected, and a hydrogel polymer having a (weight average) particle diameter of 2 to 50 mm may be usually obtained.

In addition, when photopolymerization of the monomer mixture is performed in the reactor equipped with a movable conveyor belt, a hydrogel polymer in the form of a sheet may be obtained. At this time, a thickness of the sheet may vary depending on the concentration and injection rate of the monomer mixture to be injected, and it is preferable to adjust the thickness to 0.5 to 10 cm in order to allow the entire sheet to be polymerized evenly for ensuring a production speed, and the like.

After forming the hydrogel polymer by the above-mentioned cross-linking polymerization, the hydrogel polymer having a controlled moisture content is gel-pulverized.

The pulverizer used for the gel-pulverization is not particularly limited. Specifically, it may include at least one selected from the group consisting of a vertical pulverizer, a turbo cutter, a turbo grinder, a rotary cutter mill, a cutter mill, a disc mill, a shred crusher, a crusher, a chopper, and a disc cutter, but it is not limited thereto.

The gel-pulverization may be performed so that the hydrogel polymer has a particle diameter of 0.01 mm to 50 mm, or 0.01 mm to 30 mm. In order to increase a drying efficiency, the hydrogel polymer is preferably pulverized to have a particle diameter of 50 mm or less. However, since excessive pulverization may cause aggregation between particles, the hydrogel polymer is preferably pulverized to have a particle diameter of 0.01 mm or more.

In addition, since the gel-pulverization of the hydrogel polymer is performed in a relatively low moisture content, a phenomenon that the hydrogel polymer adheres to the surface of the gel-pulverizer may occur. In order to minimize this phenomenon, steam, water, surfactants, anti-agglomeration agents (for example, clay, silica, etc.), persulfate-based initiators, azo-based initiators, hydrogen peroxide, thermal polymerization initiators, epoxy-based cross-linking agents, diol-based cross-linking agents, bi-, tri- or higher-functional cross-linking agents containing an acrylate, mono-functional cross-linking agents containing a hydroxyl group, or the like can be added to the hydrogel polymer, if necessary.

After the gel-pulverization, the hydrogel polymer may be dried. More specifically, the drying process may be performed at a temperature of 120 to 250° C., 140 to 200° C., or 150 to 200° C. At this time, the drying temperature may be defined as a temperature of a thermal medium supplied for drying or a temperature inside a dryer including a thermal medium and a polymer in a drying process. When the drying temperature is low and the drying time is long, the process efficiency may be decreased, so the drying temperature is preferably 120° C. or higher to prevent this. When the drying temperature is too high, the surface of the hydrogel polymer is excessively dried to generate fine powders in a subsequent pulverization step, and physical properties of the polymer finally prepared may be decreased. Thus, the drying temperature is preferably 250° C. or lower to prevent this.

Herein, the drying time in the drying step is not particularly limited, but may be adjusted to 20 to 90 minutes within the above drying temperature range in consideration of process efficiency and physical properties of the polymer.

The drying may be performed using a conventional medium. For example, the drying may be performed by the method of hot air provision, infrared radiation, microwave radiation, or UV ray radiation.

And, such drying is preferably performed so that the dried polymer has a moisture content of 0.1 to 10 wt %. When the moisture content of the dried polymer is less than 0.1 wt %, an increase in manufacturing cost and degradation of the cross-linked polymer may occur due to excessive drying, which is not preferable. In addition, when the moisture content of the dried polymer exceeds 10 wt %, the dried polymer may adhere to the transfer path in a subsequent process, which is not preferable.

After the drying, the dried polymer may be pulverized, whereby the particle diameter and surface area of the polymer can be adjusted to an appropriate range. The pulverization may be performed such that the pulverized polymer has a particle diameter of 150 to 850 μm. At this time, the particle diameter may also be defined as the longest diameter of each polymer particle, and is the same in the following.

A pin mill, a hammer mill, a screw mill, a roll mill, a disc mill, or a jog mill may be used as the pulverizer.

Further, in order to control the properties of the super absorbent polymer finally commercialized, a step of selectively classifying particles having a particle diameter of 150 to 850 μm from the polymer particles obtained through the pulverization step may be further performed.

In the base resin powder prepared through the classification process, as described above, the formation ratio of the base resin powder having an aspect ratio defined as shortest diameter/longest diameter of less than 0.5 can be greatly reduced to less than 9.9% by number, 1 to 9.9% by number, or 3 to 9.7% by number. Therefore, there is practically no fear that other physical properties such as absorption performance are deteriorated during surface cross-linking or mixing with additives and the like.

After preparing the base resin powder through the above-described classification process, super absorbent polymer particles may be formed by surface cross-linking in the presence of a surface cross-linking agent while heat-treating the base resin powder. The surface cross-linking step is a step of inducing a cross-linking reaction on the surface of the base resin powder in the presence of a surface cross-linking agent, and a surface modified layer (surface cross-linked layer) may be formed on the surface of the base resin powder through the surface cross-linking.

Since the type of the surface cross-linking agent has already been described above, additional description thereof will be omitted.

In addition, the amount of the surface cross-linking agent may be appropriately adjusted according to the type of the cross-linking agent or the reaction conditions, and may preferably be 0.001 to 5 parts by weight based on 100 parts by weight of the base resin powder. When the amount of the surface cross-linking agent is excessively small, the surface modification may not be properly performed, and physical properties of the final polymer may be deteriorated. Conversely, when an excessive amount of the surface cross-linking agent is used, the basic absorption performance of the polymer may be rather lowered due to the excessive surface cross-linking reaction, which is undesirable.

Meanwhile, the above-mentioned surface cross-linking step may further use at least one selected from the group consisting of polyvalent metal salts, for example, aluminum salts, more specifically, sulfates, potassium salts, ammonium salts, sodium salts, and hydrochloride salts of aluminum, in addition to the surface cross-linking agent.

As the polyvalent metal salt is additionally used, liquid permeability of the super absorbent polymer prepared by the method of one embodiment may be further improved. The polyvalent metal salt may be added to the surface cross-linking solution together with the surface cross-linking agent, and may be used in an amount of 0.01 to 4 parts by weight based on 100 parts by weight of the base resin powder.

Meanwhile, the surface cross-linking process may be performed using a surface cross-linking solution containing water and/or a hydrophilic organic solvent (for example, an alcohol-based polar organic solvent such as methanol) as a liquid medium, together with the surface cross-linking agent described above. At this time, the content of the water and the hydrophilic organic solvent may be appropriately adjusted based on the 100 parts by weight of the base resin powder to induce even dispersion of the surface cross-linking solution and prevent agglomeration of the base resin powder while optimizing a surface penetration depth of the surface cross-linking agent.

The method of adding the above-mentioned surface cross-linking solution to the base resin powder is not particularly limited. For example, the surface cross-linking solution and the base resin powder are mixed in a reaction tank, the surface cross-linking solution is sprayed onto the base resin powder, or the base resin powder and the surface cross-linking solution are continuously supplied to a mixer that is continuously operated, and then mixed.

The surface cross-linking reaction may be performed for the base resin powder to which the surface cross-linking solution is added at a maximum reaction temperature of 140° C. to 200° C. or 170° C. to 195° C. for 5 minutes to 60 minutes, 10 minutes to 50 minutes, or 20 minutes to 45 minutes. More specifically, the surface cross-linking step may be performed by increasing an initial temperature of 20° C. to 130° C., or 40° C. to 120° C. to a highest temperature of the reaction over 10 minutes or more, or 10 minutes to 30 minutes, and maintaining at the highest temperature for 5 to 60 minutes for heat-treatment.

When satisfying these surface cross-linking conditions (particularly, temperature increasing conditions and reaction conditions at the highest temperature), a super absorbent polymer satisfying the physical properties of one embodiment can be more effectively prepared.

The heating means for the surface cross-linking reaction is not particularly limited. It is possible to provide a thermal media thereto or provide a heat source directly thereto. At this time, usable thermal media may be a heated fluid such as steam, hot air, hot oil, and the like, but the present invention is not limited thereto. Furthermore, the temperature of the thermal media provided thereto may be properly selected in consideration of the means of the thermal media, heating speed, and target temperature of heating. Meanwhile, an electric heater or a gas heater may be used as the heat source provided directly, but the present invention is not limited thereto.

The super absorbent polymer obtained according to the above-described preparation method maintains excellent absorption performance such as water retention capacity and absorbency under pressure, and satisfies an improved absorption rate, thereby satisfying various physical properties of one embodiment. As a result, the super absorbent polymer can be suitably used in sanitary materials such as diapers, in particular, ultra-thin sanitary materials having a reduced pulp content.

Advantageous Effects

The super absorbent polymer according to the present disclosure can exhibit an improved absorption rate while maintaining excellent basic absorption performance, and thus, it can be preferably applied to sanitary materials such as diapers having a thinner thickness.

BRIEF DESCRIPTION OF THE DRAWINGS

FIG. 1 is an electron micrograph showing an example of a method for defining and measuring an aspect ratio of super absorbent polymer particles in a super absorbent polymer of one embodiment.

DETAILED DESCRIPTION OF THE EMBODIMENTS

Hereinafter, the present invention will be described in more detail with reference to examples. However, these examples are for illustrative purposes only, and the invention is not intended to be limited by these examples.

Example 1

As a super absorbent polymer manufacturing apparatus, a continuous manufacturing apparatus including a polymerization process, a hydrogel pulverization process, a drying process, a pulverization process, a classification process, a surface cross-linking process, a cooling process, a classification process, and a transportation process connecting each process was used.

0.4 parts by weight of polyethylene glycol diacrylate (weight average molecular weight: ~500 g/mol) as an internal cross-linking agent, 0.01 parts by weight of sodium lauryl sulfate as a surfactant, and 0.01 parts by weight of phenylbis(2,4,6-trimethylbenzoyl)phosphine oxide as a photoinitiator were mixed with 100 parts by weight of acrylic acid to prepare a monomer solution. Subsequently, while continuously supplying the monomer solution to a metering pump, 160 parts by weight of a 24 wt % aqueous solution of sodium hydroxide was continuously line-mixed to prepare a monomer aqueous solution. In addition, 6 parts by weight of a 4 wt % aqueous solution of sodium persulfate was continuously line-mixed to prepare a monomer mixture.

The monomer mixture was first introduced through a single tube having a diameter (maximum diameter section) of 0.015 m at a flow rate of 240 kg/h. Secondarily, it was continuously transferred through a single tube (minimum diameter section) in which the diameter is changed to 0.008 m. In this transfer process, the transfer rate of each section was as summarized in Table 1 below.

Through this transfer, the monomer aqueous solution was introduced into a polymerization reactor equipped with a movable conveyor belt, and UV polymerization was performed for 2 minutes by irradiating ultraviolet rays (irradiation amount: 2 mW/cm$^2$) through a UV irradiation device to prepare a hydrogel polymer.

After cutting the hydrogel to have an average size of about 300 mm or less, it was put into a pulverizer (equipped with a porous plate including a plurality of holes having a diameter of 10 mm) and pulverized.

Subsequently, the pulverized hydrogel was dried in a dryer capable of changing wind direction up and down. The hydrogel was uniformly dried by flowing hot air at 180° C. from bottom to top for 15 minutes so that the moisture content of the dried powder was about 2% or less, and then flowing from top to bottom for 15 minutes.

The dried polymer was pulverized using a pulverizer and then classified to obtain a base resin having a size of 150 to 850 μm.

Thereafter, 6 g of a surface cross-linking aqueous solution containing 3 parts by weight of ethylene carbonate was sprayed onto 100 parts by weight of the prepared base resin powder, and stirred at room temperature to mix the surface cross-linking solution evenly on the base resin powder. Subsequently, the base resin powder mixed with the surface cross-linking solution was placed in a surface cross-linking reactor to perform a surface cross-linking reaction.

The surface cross-linking reactor was operated such that the base resin powder was gradually heated from an initial temperature near 80° C. to reach a highest temperature of 190° C. after 30 minutes. After reaching the highest temperature, a further reaction was performed for 15 minutes, and then a sample of the super absorbent polymer finally produced was taken. After the surface cross-linking process, it was classified using an ASTM standard mesh to prepare a super absorbent polymer of Example 1 having a particle diameter of 150 μm to 850 μm.

The base resin and super absorbent polymer obtained by the above method were analyzed by an electron microscope (see FIG. 1, etc.) to calculate the aspect ratio (a/b) of each base resin powder and super absorbent polymer particle. Thereafter, a ratio of particles (% by number) having an aspect ratio of less than 0.5 among the total base resin powder and super absorbent polymer particles was measured. As a result of the measurement, the ratio of particles having an aspect ratio of less than 0.5 among the total base resin powder and super absorbent polymer particles is shown in Table 1 below.

Example 2

A super absorbent polymer of Example 2 was prepared in the same manner as in Example 1, except that the diameter of the single tube (transfer pipe) in the minimum diameter section was changed to 0.006 m during transfer of the monomer mixture to adjust the maximum transfer rate in the corresponding section as shown in Table 1 below.

Example 3

A super absorbent polymer of Example 3 was prepared in the same manner as in Example 1, except that the flow rate of the monomer mixture was adjusted to 400 kg/h to adjust the transfer rate of the monomer mixture in each section as shown in Table 1 below.

Example 4

A super absorbent polymer of Example 4 was prepared in the same manner as in Example 1, except that 0.005 parts by weight of the surfactant was included in the monomer mixture.

Example 5

A super absorbent polymer of Example 5 was prepared in the same manner as in Example 1, except that the monomer mixture was first introduced through a single tube having a diameter (maximum diameter section) of 0.015 m at a flow rate of 240 kg/h, and continuously transferred through a single tube (minimum diameter section) in which the diameter is changed to 0.002 m. In this transfer process, the transfer rate in each section is summarized in Table 1 below.

Comparative Example 1

A super absorbent polymer of Comparative Example 1 was prepared in the same manner as in Example 1, except that the diameter of the single tube (transfer pipe) in the minimum diameter section was changed to 0.012 m during transfer of the monomer mixture to adjust the maximum transfer rate in the corresponding section as shown in Table 1 below.

Comparative Example 2

A super absorbent polymer of Comparative Example 2 was prepared in the same manner as in Example 1, except that the diameter of the single tube (transfer pipe) in the minimum diameter section was changed to 0.015 m during transfer of the monomer mixture to adjust the maximum transfer rate in the corresponding section as shown in Table 1 below.

Comparative Example 3

A super absorbent polymer of Comparative Example 3 was prepared in the same manner as in Example 1, except that 0.02 parts by weight of the surfactant was included, and a 0.1 wt % sodium hydrogen carbonate blowing agent was further mixed in the monomer mixture.

Experimental Examples

The properties of each super absorbent polymer prepared in Examples and Comparative Examples, and various properties in the manufacturing process were measured and evaluated in the following manner.

(1) Transfer Rate of Monomer Aqueous Solution (m/s)

The transfer rate of the monomer aqueous solution was calculated from the following equation by obtaining a cross-sectional area from a diameter of the transfer pipe in the transfer section and measuring a flow rate of the monomer mixture in the same section:

$$\text{Transfer rate (m/s)} = \text{flow rate (m}^3\text{/hr)/cross-sectional area (m}^2\text{)}$$

(2) Measurement of Aspect Ratio and Particle Distribution of Base Resin Powder and Super Absorbent Polymer Particles As shown in FIG. 1, the shortest diameter (a) and the longest diameter (b) of each powder/particle were calculated by an electron microscope, and the aspect ratio of each powder/particle was measured therefrom. Thereafter, the ratio (% by number) of the number of powder/particles having an aspect ratio of less than 0.5 among the total powder/particles obtained in each Example/Comparative Example was calculated.

(3) Centrifuge Retention Capacity (CRC)

The centrifuge retention capacity (CRC) by absorption ratio under a non-loading condition was measured according to the EDANA (European Disposables and Nonwovens Association) WSP 241.3 method. After inserting $W_0$ (g, about 0.2 g) of the super absorbent polymer uniformly in a nonwoven fabric envelope and sealing the same, it was soaked in saline (0.9 wt % aqueous solution of sodium chloride) at room temperature. After 30 min, the envelope was centrifuged at 250 G for 3 minutes to drain, and the weight $W_2$ (g) of the envelope was measured. Further, after carrying out the same operation without using the super absorbent polymer, the weight $W_1$ (g) of the envelope was measured. Then, CRC (g/g) was calculated by using the obtained weight values according to the following Formula 1.

$$CRC(g/g) = \{[W_2(g) - W_1(g) - W_0(g)]/W_0(g)\} \qquad \text{[Formula 1]}$$

(4) Absorbency Under Pressure (AUP)

The absorbency under pressure (AUP) of each super absorbent polymer prepared in Examples and Comparative Examples was measured according to the EDANA (European Disposables and Nonwovens Association) WSP 242.3 method.

First, a 400 mesh stainless steel screen was installed in a cylindrical bottom of a plastic having an inner diameter of 60 mm. $W_0$ (g, 0.90 g) of the polymer prepared in each of Examples 1 to 6 and Comparative Examples 1 to 4 was uniformly scattered on the screen at a temperature of 23±2° C. and a relative humidity of 45%. Thereafter, a piston which can uniformly provide a load of 4.83 kPa (0.7 psi) was placed on the polymer. Herein, the outer diameter of the piston was slightly smaller than 60 mm, there was no gap with the inner wall of the cylinder, and jig-jog of the cylinder was not interrupted. At this time, the weight $W_3$ (g) of the device was measured.

Subsequently, a glass filter having a diameter of 125 mm and a thickness of 5 mm was placed in a petri dish having a diameter of 150 mm, and saline (0.9 wt % sodium chloride) was poured in the dish. At this time, the saline was poured until the surface level of the saline became equal to the upper surface of the glass filter. After the measuring device was mounted on the glass filter, the liquid was absorbed for 1 hour under a load. After 1 hour, the measuring device was lifted, and the weight $W_4$ (g) was measured.

Then, AUP (g/g) was calculated by using the obtained weight values according to the following Formula 2.

$$\text{AUP}(g/g) = [W_4(g) - W_3(g)] / W_0(g) \quad \text{[Formula 2]}$$

In Formula 2, $W_0$ (g) is an initial weight (g) of the super absorbent polymer, $W_3$ (g) is a sum of a weight of the super absorbent polymer and a weight of the device providing a load to the polymer, and $W_4$ (g) is a sum of a weight of the super absorbent polymer and a weight of the device providing a load to the polymer, after making the super absorbent polymer absorb the saline for one hour under a load (0.7 psi).

(5) Absorption Rate by Vortex Method (Vortex Time)

The absorption rate (vortex time) of each super absorbent polymer of Examples and Comparative Examples was measured in seconds according to the method disclosed in International Patent Publication No. 1987-003208.

Specifically, the absorption rate (or vortex time) was calculated by adding 2 g of the super absorbent polymer to 50 mL of saline at 23° C. to 24° C., stirring a magnetic bar (8 mm in diameter and 31.8 mm in length) at 600 rpm, and measuring the time until vortex disappeared in seconds.

(6) Surface Tension of Super Absorbent Polymer

All procedures were conducted in a constant temperature and humidity room (temperature 23±0.5° C., relative humidity 45±0.5%). 150 g of saline composed of 0.9 wt % sodium chloride was placed in a 250 mL beaker and stirred with a magnetic bar. 1.0 g of the super absorbent polymer was added to the stirring solution, stirred for 3 minutes, and then allowed to stand for 15 minutes or more so that the swollen super absorbent polymer settled on the bottom.

Thereafter, the supernatant (the solution immediately below the surface) was extracted with a pipette, and transferred to another clean cup to measure the surface tension using a surface tension meter (Kruss K11/K100).

The physical properties of Examples 1 to 5 and Comparative Examples 1 to 3 measured by the above method are summarized in Table 1 below.

TABLE 1

|  | Ex. 1 | Ex. 2 | Ex. 3 | Ex. 4 | Ex. 5 | Comp. Ex. 1 | Comp. Ex. 2 | Comp. Ex. 3 |
|---|---|---|---|---|---|---|---|---|
| Flow rate (kg/hr) | 240 | 240 | 400 | 240 | 240 | 240 | 240 | 240 |
| pipe 1 Dia.(m) (Dia. in maximum diameter section) | 0.015 | 0.015 | 0.015 | 0.015 | 0.015 | 0.015 | 0.015 | 0.015 |
| Transfer rate in maximum diameter section (m/s) | 0.32 | 0.32 | 0.32 | 0.32 | 0.32 | 0.32 | 0.32 | 0.32 |
| Pipe 2 Dia.(m) (Dia. in minimum diameter section) | 0.008 | 0.006 | 0.008 | 0.008 | 0.002 | 0.012 | 0.015 | 0.015 |
| Transfer rate in minimum diameter section (m/s) | 1.1 | 1.8 | 2.1 | 1.1 | 1.3 | 0.65 | 0.32 | 0.32 |
| Particle distribution (aspect ratio less than 0.5; % by number) | 8.8 | 9.5 | 9.2 | 5.5 | 5.8 | 7.2 | 10.5 | 45.0 |
| CRC (g/g) | 30.5 | 28.7 | 30.1 | 31.0 | 29.0 | 29.2 | 29.5 | 27.7 |
| AUP (g/g) | 26.0 | 25.5 | 24.0 | 25.2 | 24.2 | 24.5 | 24.7 | 24.5 |
| Absorbency (g/g) | 56.5 | 54.2 | 54.1 | 56.2 | 53.2 | 53.7 | 54.2 | 53.5 |
| Surface tension (mN/m) | 70.2 | 69.8 | 67.2 | 70.8 | 70.0 | 70.1 | 69.7 | 63.3 |
| Vortex (sec) | 48 | 39 | 35 | 55 | 32 | 65 | 63 | 49 |

Referring to Table 1, the super absorbent polymers of Examples 1 to 5 in which the transfer rate was controlled during the transfer of the monomer aqueous solution exhibited water retention capacity, absorbency under pressure, and surface tension equal to or higher than those of Comparative Examples, along with an improved absorption rate.

It was confirmed in Comparative Example 3 that the absorption rate was improved to some extent, but the absorbency was reduced compared to Examples due to the use of a blowing agent and a surfactant. In addition, as the particles having a small aspect ratio were contained in a large amount in Comparative Example 3, breakage of particles or deterioration in physical properties is expected to be very significant in the process of transferring the super absorbent polymer or applying the polymer to products.

The invention claimed is:

1. A preparation method of a super absorbent polymer, comprising:
    preparing a monomer mixture comprising a water-soluble ethylene-based unsaturated monomer having at least partially neutralized acidic groups and an internal cross-linking agent;

transferring the monomer mixture to a polymerization reactor along a transfer pipe having a diameter that varies from section to section;

cross-linking and polymerizing the monomer mixture transferred to the polymerization reactor to form a hydrogel polymer containing a first cross-linked polymer;

gel-pulverizing, drying, pulverizing and classifying the hydrogel polymer to form a base resin powder containing less than 9.9% by number of base resin powder having an aspect ratio, which is defined as shortest diameter/longest diameter of each base resin powder, of less than 0.5; and further cross-linking a surface of the base resin powder in the presence of a surface cross-linking agent to form a surface cross-linked layer;

wherein during the transferring of the monomer mixture, the monomer mixture has a maximum transfer rate in a minimum diameter section of the transfer pipe and a minimum transfer rate in a maximum diameter section of the transfer pipe, and the maximum transfer rate is 2.5 times or more compared to the minimum transfer rate.

2. The preparation method of a super absorbent polymer of claim 1,
wherein the monomer mixture further comprises a surfactant.

3. The preparation method of a super absorbent polymer of claim 1,
wherein the monomer mixture is transferred in the minimum diameter section of the transfer pipe at a rate of 0.45 to 2.5 m/s, and is transferred in the maximum diameter section of the transfer pipe at a rate of 0.1 to 0.4 m/s.

4. The preparation method of a super absorbent polymer of claim 1,
wherein the transfer pipe has a diameter of 0.002 to 0.01 m in the minimum diameter section, and has a diameter of 0.011 to 0.020 m in the maximum diameter section before the minimum diameter section.

5. The preparation method of a super absorbent polymer of claim 1,
wherein the monomer mixture is transferred through the transfer pipe at a flow rate of 100 to 15000 kg/hr.

6. The preparation method of a super absorbent polymer of claim 1,
wherein bubbles are generated in the monomer by the change in the transfer rate during the transfer of the monomer mixture, and a foaming polymerization proceeds by the generated bubbles during the cross-linking polymerization.

7. The preparation method of a super absorbent polymer of claim 1,
wherein the surface cross-linking agent comprises at least one of polyalcohol-based compounds, polyepoxy-based compounds, polyamine compounds, haloepoxy compounds, condensates of haloepoxy compounds, oxazoline-based compounds, or alkylene carbonate-based compounds.

8. The preparation method of a super absorbent polymer of claim 1,
wherein the surface cross-linking is carried out by increasing an initial temperature of 20° C. to 130° C. to a highest temperature of 140° C. to 200° C. over 10 minutes to 30 minutes, and maintaining at the highest temperature for 5 to 60 minutes for heat-treatment.

* * * * *